(12) United States Patent
Vezina

(10) Patent No.: US 7,708,096 B2
(45) Date of Patent: May 4, 2010

(54) SNOWMOBILE FOOTREST HAVING FOOT GRIPPING ELEMENTS

(75) Inventor: Sébastien Vezina, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 469 days.

(21) Appl. No.: 11/676,157

(22) Filed: Feb. 16, 2007

(65) Prior Publication Data

US 2008/0196958 A1  Aug. 21, 2008

(51) Int. Cl.
*B62D 25/22* (2006.01)

(52) U.S. Cl. .................. 180/90.6; 180/190; 280/164.2; 280/291

(58) Field of Classification Search ................. 180/190, 180/89.1, 90.6; 280/291, 813, 163, 164.1, 280/164.2, 169; 74/564; 224/519, 521, 532, 224/537
See application file for complete search history.

(56) References Cited

U.S. PATENT DOCUMENTS

| | | | | | |
|---|---|---|---|---|---|
| 802,936 | A | * | 10/1905 | Marius | 52/181 |
| 1,343,356 | A | * | 6/1920 | Doe | 15/238 |
| 1,680,032 | A | * | 8/1928 | Anderson | 428/596 |
| 2,843,870 | A | * | 7/1958 | Perry | 15/237 |
| 6,604,594 | B2 | | 8/2003 | Wubbolts et al. | |
| 6,968,917 | B2 | * | 11/2005 | Rondeau et al. | 180/89.1 |
| 2005/0121244 | A1 | * | 6/2005 | Mallette et al. | 180/183 |
| 2005/0184482 | A1 | * | 8/2005 | Byrne | 280/164.1 |
| 2009/0008170 | A1 | * | 1/2009 | Claussen | 180/90.6 |

\* cited by examiner

*Primary Examiner*—Lesley Morris
*Assistant Examiner*—Maurice Williams
(74) *Attorney, Agent, or Firm*—Osler, Hoskin & Harcourt LLP

(57) ABSTRACT

A snowmobile footrest has a top surface, a first foot gripping element extending upwardly and forwardly from the top surface, and a second foot gripping element extending upwardly and rearwardly from the top surface. A snowmobile frame and a snowmobile having the footrest are also disclosed.

12 Claims, 5 Drawing Sheets

SNOWMOBILE FOOTREST HAVING FOOT GRIPPING ELEMENTS

FIELD OF THE INVENTION

This invention relates to foot gripping elements for snowmobile footrests.

BACKGROUND OF THE INVENTION

When riding a snowmobile, a rider will generally be seated on a straddle seat with his hands on a handlebar and his feet resting on footrests disposed on either side of the seat.

Snowmobiles are frequently operated on uneven terrain. When a snowmobile encounters a bump as it travels over the ground, the rider may wish to raise himself off the seat and support himself on the footrests in a partially standing position to minimize the impact of the bump. When he does this, his weight is supported entirely by the footrests.

When the snowmobile is being operated, and in particular when the rider is supported entirely by the footrests, it is important for the rider's feet to have good traction on the footrests, so as to maintain the rider's feet in position and prevent them from slipping.

One way to provide improved grip on a snowmobile footrest is shown in U.S. Pat. No. 6,604,594 (Wubbolts) issued on Aug. 12, 2003 and assigned to the owner of the present application, which is incorporated herein by reference in its entirety. Wubbolts describes a snowmobile footrest having foot gripping elements extending upwardly and forwardly from the top surface thereof. While this footrest provides adequate grip for the foot of a rider and prevents slippage in the rearward direction, it is believed that further improvements in snowmobile footrests are possible.

SUMMARY OF THE INVENTION

In the description that follows, the terms "forward" and "rearward" are defined relative to the normal forward direction of travel of a snowmobile.

It was noticed that when a rider is in a seated position, his feet are typically positioned near the front of the footrest, and need to be secured primarily against slippage in the forward direction. When the rider is in a standing position, his feet are typically positioned farther rearward on the footrest, and need to be secured primarily against slippage in the rearward direction. Taking these observations into account, it was found that improvements in snowmobile footrests can be provided, to better stabilize a rider's foot against slippage in the forward direction when the rider is seated and he tends to exert a force on his feet in a forward direction on the footrests, and also to stabilize the rider's foot against slippage in the rearward direction when the rider is standing and he tends to exert a force on his feet in a rearward direction on the footrests. Thus, an improved footrest in accordance with the present invention can better ensure that the rider's feet remain in a desired position while riding the snowmobile in different riding positions.

It is therefore an object of the invention to provide a snowmobile having an improved footrest, at least with respect to some aspects of the prior art.

It is a further object of the invention to provide a snowmobile having an improved footrest. The footrest has a rear portion with upwardly and forwardly extending foot gripping elements to resist slipping of a rider's foot in a rearward direction. The footrest further has a front portion with upwardly and rearwardly extending foot gripping elements to resist slipping of the rider's foot in a forward direction.

One aspect of the present invention provides a snowmobile comprising a frame including a tunnel. The tunnel has sides, and footrests extending outwardly from the sides thereof for receiving feet of a rider. Each footrest has a top surface, a first foot gripping element extending upwardly from the top surface and angled upwardly and forwardly with respect thereto, and a second foot gripping element extending upwardly from the top surface and angled upwardly and rearwardly with respect thereto. An engine is disposed on the frame at a forward end thereof. A seat is disposed on the tunnel rearward of the engine. A front suspension system is connected to the frame. At least one ski is operatively connected to the frame by the front suspension system. A steering device is disposed on the frame forward of the seat and is operatively connected to the at least one ski for steering the snowmobile. An endless drive track is disposed below the tunnel and operatively connected to the engine for propulsion of the snowmobile.

In a further aspect, the first foot gripping element is one of a first plurality of foot gripping elements extending upwardly from the top surface and angled upwardly and forwardly with respect thereto. The second foot gripping element is one of a second plurality of foot gripping elements extending upwardly from the top surface and angled upwardly and rearwardly with respect thereto.

In a further aspect, each foot gripping element in the first and second pluralities of foot gripping elements comprises a jagged portion at a top thereof.

In a further aspect, the jagged portions define teeth.

In a further aspect, the forward-most first foot gripping element is disposed rearward of the rearward-most second foot gripping element.

In a further aspect, each footrest further comprises a bottom surface, a plurality of holes therethrough, and a plurality of deflector elements associated with the holes and extending downwardly from the bottom surface for discouraging particles from passing through the holes.

In a further aspect, each foot gripping element in the first and second pluralities of foot gripping elements is disposed along a contour of at least one of the plurality of holes.

In a further aspect, each foot gripping element in the first plurality of foot gripping elements is disposed along a rearward portion of the contour of at least one of the plurality of holes. Each foot gripping element in the second plurality of foot gripping elements is disposed along a forward portion of the contour of at least one of the plurality of holes.

In a further aspect, the tunnel is made at least in part from sheet metal.

In a further aspect, the first and second foot gripping elements are integrally formed with the footrests.

Another aspect of the present invention provides a snowmobile footrest, comprising a top surface, a first foot gripping element extending upwardly and forwardly from the top surface, and a second foot gripping element extending upwardly and rearwardly from the top surface.

In a further aspect, the first foot gripping element is one of a first plurality of foot gripping elements extending upwardly from the top surface and angled upwardly and forwardly with respect thereto. The second foot gripping element is one of a second plurality of foot gripping elements extending upwardly from the top surface and angled upwardly and rearwardly with respect thereto.

In a further aspect, each foot gripping element in the first and second pluralities of foot gripping elements comprises a jagged portion at a top thereof.

In a further aspect, the jagged portion defines teeth.

In a further aspect, the forward-most first foot gripping element is disposed rearward of the rearward-most second foot gripping element.

In a further aspect, the footrest further comprises a bottom surface, a plurality of holes therethrough, and a plurality of deflector elements associated with the holes and extending downwardly from the bottom surface for discouraging particles from passing through the holes.

In a further aspect, each foot gripping element in the first and second pluralities of foot gripping elements is disposed along a contour of at least one of the plurality of holes.

In a further aspect, each foot gripping element in the first plurality of foot gripping elements is disposed along a rearward portion of the contour of at least one of the plurality of holes. Each foot gripping element in the second plurality of foot gripping elements is disposed along a forward portion of the contour of at least one of the plurality of holes.

In a further aspect, the footrest is made at least in part from sheet metal.

In a further aspect, the first and second foot gripping elements are integrally formed with the footrest.

Other objects, aspects and features of the present invention will be made apparent by the following description, claims and accompanying drawings.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENT

Figure 1:
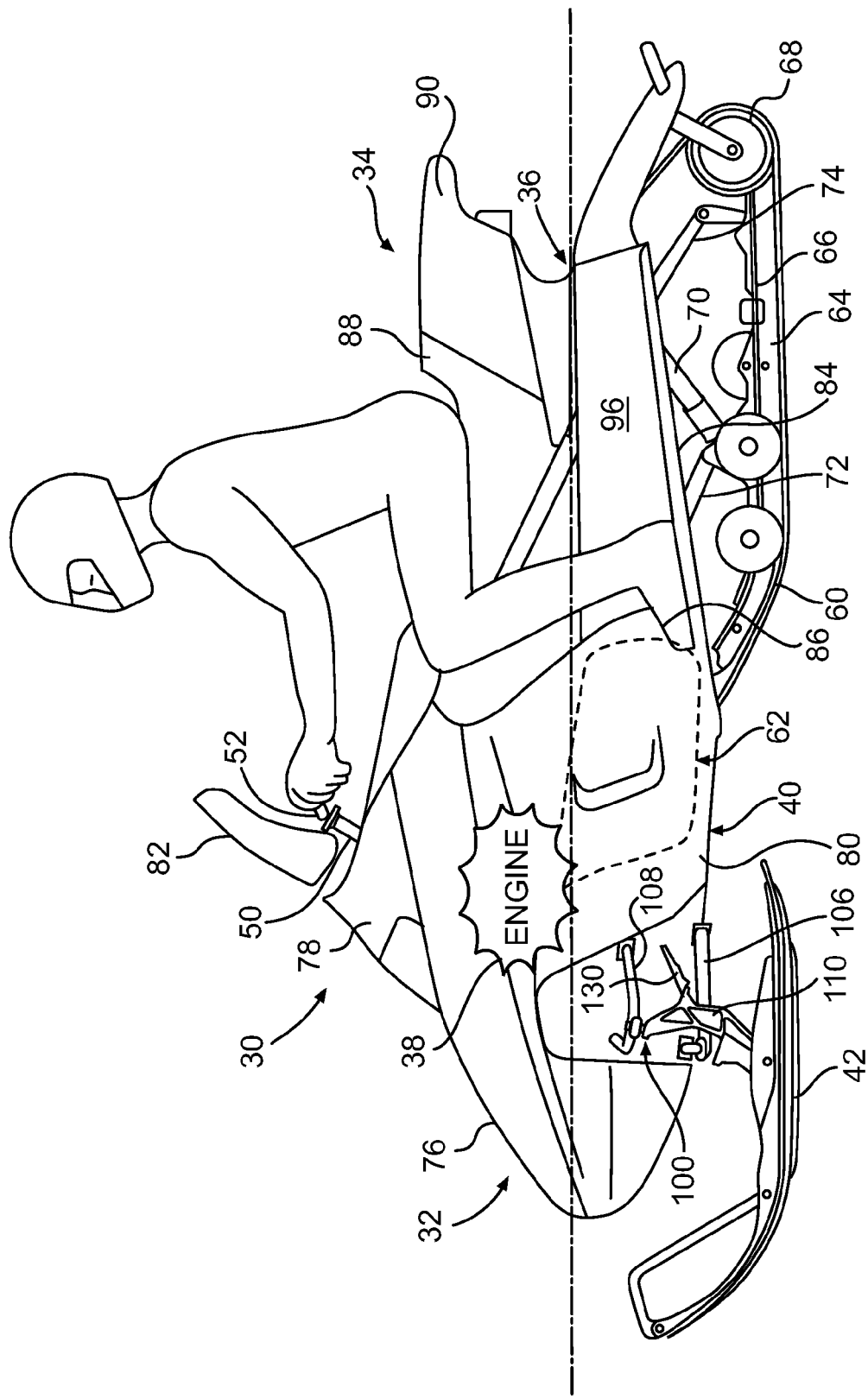
FIG. 1 is a side elevation view of a snowmobile having footrests in accordance with aspects of the present invention.

FIG. 1 illustrates a snowmobile 30 in accordance with one specific embodiment of the invention. The snowmobile 30 includes a forward end 32 and a rearward end 34 which are defined consistently with a travel direction of the vehicle. The snowmobile 30 includes a frame 36 comprising an engine cradle portion 40 and a tunnel 96. Tunnel 96 generally consists of one or more pieces of a suitable sheet metal such as steel, stamped into an inverted U-shape. It is understood that tunnel 96 may be made with materials other than steel, and that it can be formed into the desired shape by methods other than stamping, without departing from the spirit of the invention. Tunnel 96 is connected to the engine cradle portion 40 and extends rearwardly along the longitudinal axis of the snowmobile 30. While hidden behind a front fairing 54, an engine 38, schematically illustrated, provides motive force for the snowmobile 30 and is carried by the engine cradle portion 40 of the frame 36.

Two front skis 42 are attached to the front portion of the frame 36 through a front suspension system 100 in accordance with one embodiment of the invention. The front suspension system 100 generally comprises a double A-arm type suspension, having upper A-arms 108 and lower A-arms 106 on either side of the vehicle linking spindles 110 to the frame 36. The spindles 110 are attached to the skis 42 at their lower ends and rotate left and right therewith. The spindles 110 are also connected to a steering column 50 via steering rods 130. The steering column 50 is attached at its upper end to a steering device such as a handlebar 52 which is positioned forward of a rider and slightly behind the engine 38 to rotate the skis 42, thereby providing directional control of the snowmobile 30. As illustrated in dotted lines, the steering column 50 passes in front of the engine 38. The steering column 50 is designed with a bend 53 (best shown in FIG. 5) such that the steering column 50 passes in front and above the engine 38 and clears the engine 38 throughout the range of rotation of the steering column 50 when the steering device, which in this embodiment is a handlebar 52, is turned to the right or to the left. Thus, by turning the handlebar 52, the steering column 50 rotates, the spindles 110 are pivoted, and the skis 42 are turned to steer the snowmobile 30 in a desired direction.

An endless drive track 60, which provides propulsion to the snowmobile 30, is disposed under the tunnel 96 of the frame 36 with the upper portion of the drive track 60 accommodated within the tunnel 96. The endless drive track 60 is operatively connected to the engine 38 through a belt transmission system 62 which is schematically illustrated by broken lines. The drive train of the snowmobile 30 includes all the components of the snowmobile 30 whose function is to transmit power from the engine to the ground. The endless drive track 60 is mounted to the tunnel 96 via a rear suspension assembly 64. The rear suspension assembly 64 includes rear suspension arms 72 and 74, a pair of slide rails 66 which generally position and guide the endless drive track 60 and idler wheels 68 engaged therewith. Rear suspension arms 72 and 74 connect the slide rails 66 and idler wheels 68 to the tunnel 96 of the frame 36. The slide rails 66 typically include a sliding lower surface made of polyethylene to reduce contact friction between the slide rails 66 and the drive track 60. The rear suspension assembly 64 also includes one or more shock absorbers 70 which may further include a coil spring (not shown) surrounding the individual shock absorbers 70.

At the front end 32, the snowmobile 30 includes an external shell consisting of fairings 76 that enclose and protect the engine 38 and transmission 62 and that can be decorated to render the snowmobile 30 more aesthetically pleasing. Typically, the fairings 76 include a hood 78 and one or more side panels 80 which can be opened to allow access to the engine 38 and the transmission 62 when this is required, for example, for inspection or maintenance. The side panels 80 can be opened away from the snowmobile 30 along a vertical axis, independently from the hood 78, which pivots forward about a horizontally extending axis. A windshield 82, which may be connected either to the fairings 76 or directly to the handlebar 52, acts as wind deflector to lessen the force of the air on the rider when the snowmobile is moving.

A straddle-type seat 88 is positioned atop and mounted to the tunnel 96. At the rear of the straddle seat 88, a storage compartment 90 is provided. A passenger seat (not shown) can also be provided instead of the storage compartment 90. Two footrests 84, generally extending outwardly from the tunnel 96, are also positioned on either side of the straddle seat 88 to accommodate the rider's feet and provide a rigid platform for the rider to stand on when maneuvering the snowmobile 30.

Figure 2:
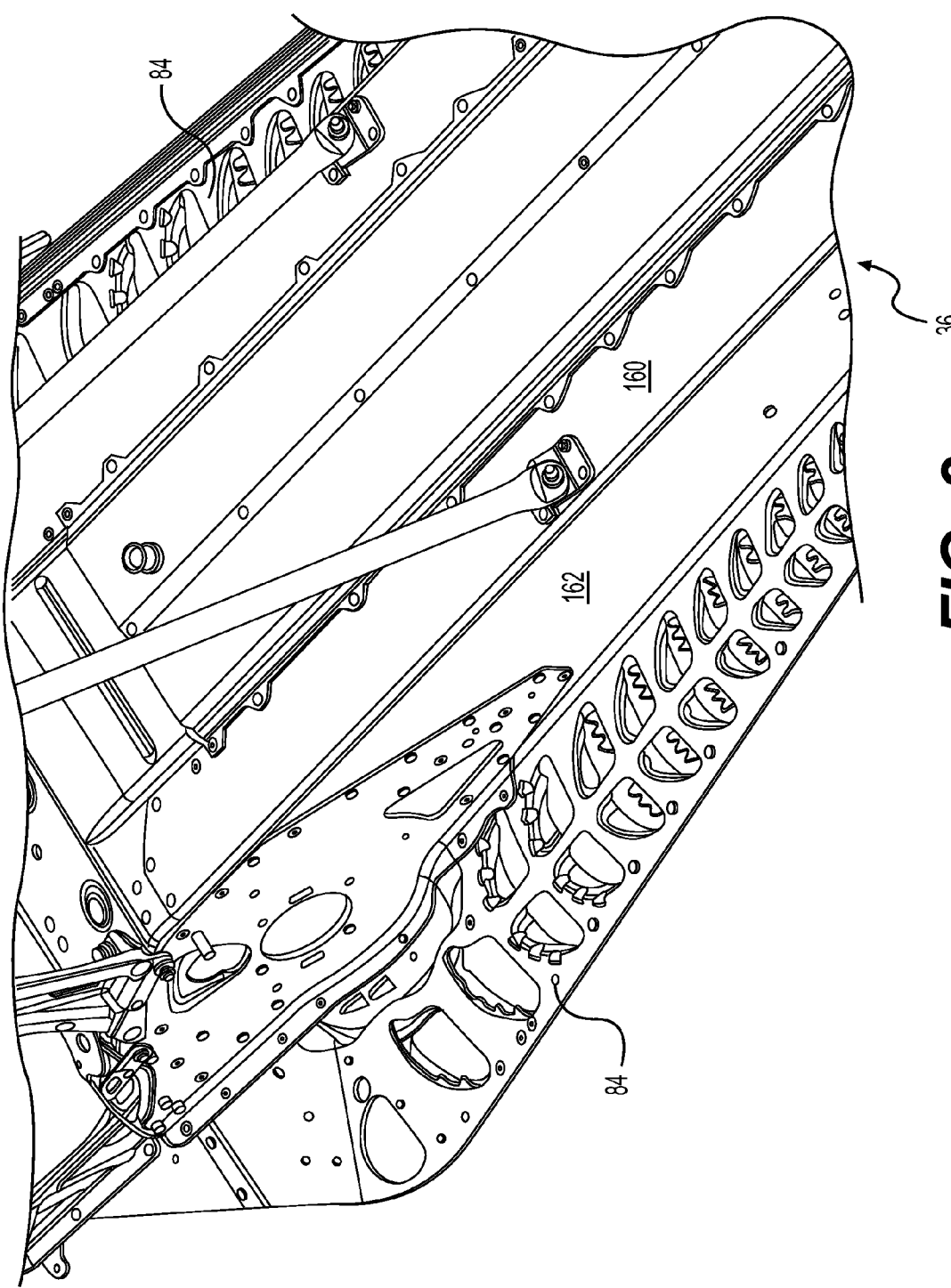
FIG. 2 is a partial perspective view of the frame of the snowmobile of FIG. 1.

FIG. 2 illustrates tunnel 96 in greater detail. Tunnel 96 includes a top plate 160 with left and right downwardly extending side plates 162. A left footrest 84 extends outwardly from the bottom of left side plate 162. Similarly, a right footrest 84 extends outwardly from the bottom portion of right side plate 162. Left and right footrests 84 provide a location along the tunnel 96 onto which a rider may place his feet while operating the snowmobile 30. As the left and right footrests 84 have substantially the same structure, only the left footrest 84 will be described in detail below. The right footrest 84 is substantially a mirror image of the left footrest 84.

Figure 3:
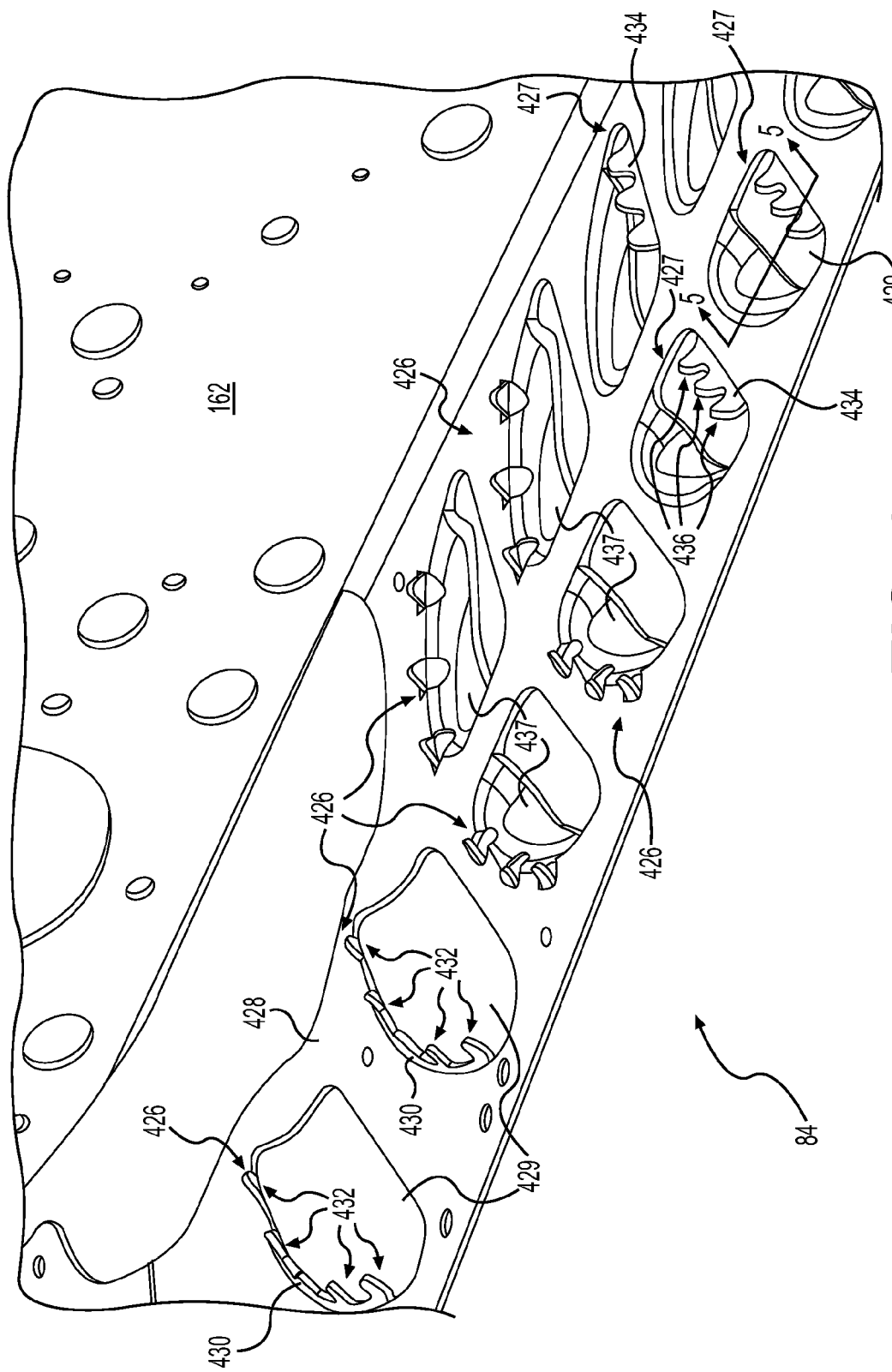
FIG. 3 is a perspective view of a left footrest of the snowmobile of FIG. 1.
Figure 4:
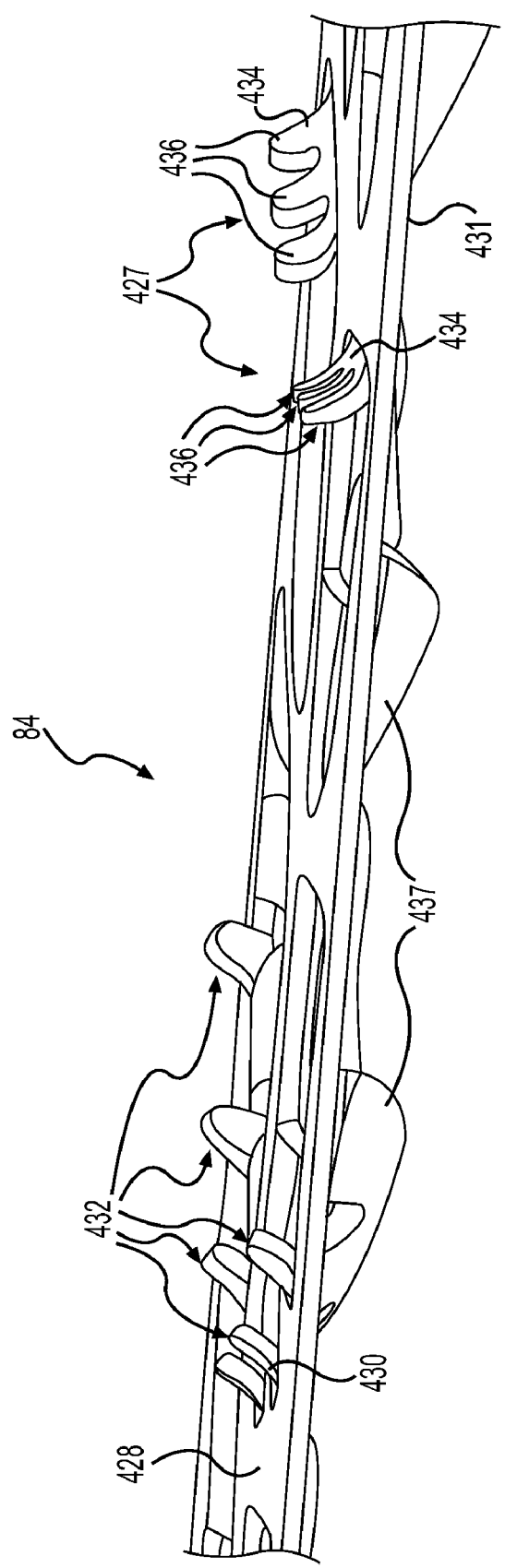
FIG. 4 is a side view of the footrest shown in FIG. 3.

Referring now to FIGS. 3 and 4, the left footrest 84 is provided with a number of foot gripping portions 426 and 427. Foot gripping portions 426 may be constructed to be part of the contour of a hole 429 through the foot rest 84. The hole 429 allows dirt and snow that may have accumulated on the top surface 428 of the footrest 84 to fall through the footrest 84 and away from the foot of the rider. Foot gripping elements 426 include a first plurality of jagged elements 430 with teeth 432 angled upwardly and rearwardly from footrest 84. Foot gripping elements 427 include a second plurality of jagged elements 434 with teeth 436 angled upwardly and forwardly from footrest 84. A deflector element 437 extending downwardly from the bottom surface 431 of the footrest is also provided, and will be described in greater detail below. The deflector element 437 discourages dirt or snow particles from passing upward through the holes 429 and accumulating on the top surface 428 of the footrest 84 while the snowmobile 30 is in use. The deflector portion 437 and the jagged portion 430 are arranged forward of hole 429 and the jagged portion 434 are arranged rearward of hole 429. This minimizes the potential for particles 439 to pass through hole 429 and accumulate on the top surface 428 of footrests 84. Other arrangements of the deflector portion 437 and of the jagged portions 430 and 434 are possible within the scope of the invention. In addition, the deflector portion 437 may be omitted without departing from the scope of the invention.

Foot gripping elements 426 and 427 provide traction for the feet of the riders because they extend upwardly from the top surface 428 of foot rest 84. In particular, jagged portions 430 and 434 maintain the rider's feet in position by opposing slippage in both forward and rearward directions according to the direction at which they are angled. The foot gripping elements 426 are arranged farther forward than the foot gripping elements 427. In this arrangement, the jagged elements 430 oppose slipping of the rider's foot in a forward direction and the jagged elements 434 oppose slipping of the rider's foot in a rearward direction. As a result, the foot gripping elements 426, 427 will tend to maintain the foot of the rider in a central position on the foot rest 84. In addition, if the rider's foot is positioned near the toe hold 86 toward the front of the foot rest 84, the upwardly and rearwardly extending jagged elements 430 disposed on the front portion of the foot rest 84 will not impede the movement of the rider's foot in a rearward direction for removal from the toe hold 86.

Figure 5:
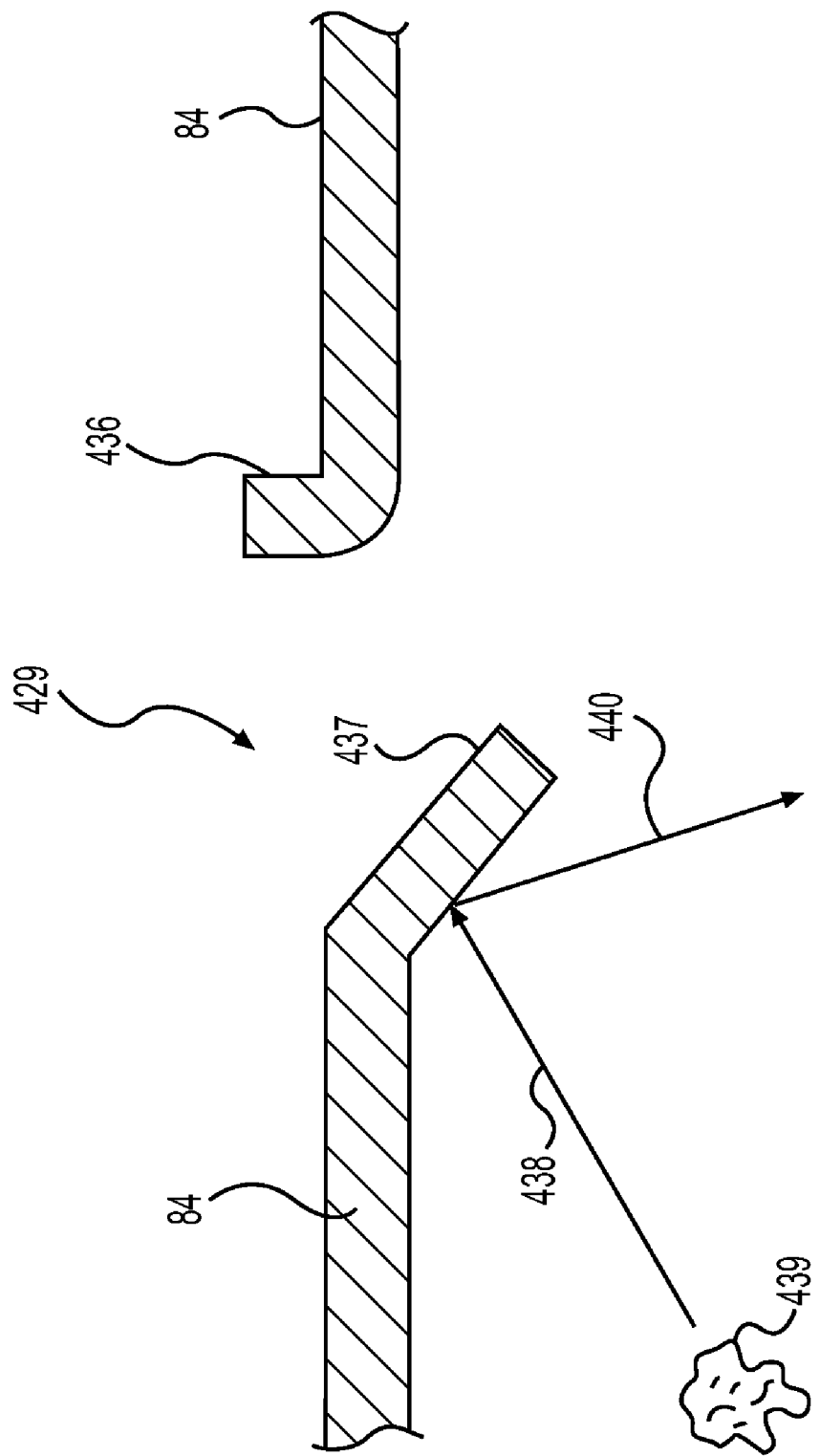
FIG. 5 is a cross-sectional illustration of the footrest of FIG. 3 taken along line 5-5 in FIG. 3.

Referring now to FIG. 5, it can be seen that the deflector elements 437 extend downwardly and rearwardly from the holes 429 in which they are located, and deflect snow or dirt particles 439 that may be stirred up by the movement of the snowmobile 30 over the ground. If a snow or dirt particle 439 moves toward the bottom surface 431 of the foot rest 84, in the direction shown by arrow 438, the deflector element 437 will deflect the particle 439 so that it travels in the direction shown by arrow 440 is away from the hole 429. As a result, particle 439 is discouraged from passing through hole 429 and therefore from accumulating on the top surface 428 of the foot rest 84.

To construct foot gripping elements 426, 427, the jagged portions 430 and 434 and deflector portion 437 are simultaneously stamped from footrest 84, which is preferably made of sheet metal. Jagged portions 430 and 434 are then bent upwardly and deflector portion 437 is bent downwardly so that the portions of foot gripping elements 426, 427 are in their corresponding orientation.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A snowmobile comprising:
    a frame including a tunnel, the tunnel having sides;
    an engine disposed on the frame at a forward end thereof;
    a seat disposed on the tunnel rearward of the engine;
    a front suspension system connected to the frame;
    at least one ski operatively connected to the frame via the front suspension system;
    a steering device disposed on the frame forward of the seat and being operatively connected to the at least one ski for steering the snowmobile; and
    an endless drive track disposed below the tunnel and operatively connected to the engine for propulsion of the snowmobile; and
    a pair of footrests, one footrest extending outwardly from each side of the tunnel, each footrest including;
        a top surface;
        a first plurality of holes through the footrest;
        a second plurality of holes though the footrest;
        a first plurality of foot gripping elements extending upwardly from the top surface and angled upwardly and forwardly with respect thereto, each foot gripping element in the first plurality of foot gripping elements being disposed along a rearward portion of a contour of at least one of the first plurality of holes, the first plurality of holes only having foot gripping elements of the first plurality of foot gripping elements; and
        a second plurality of foot gripping elements extending upwardly from the top surface and angled upwardly and rearwardly with respect thereto, each foot gripping element in the second plurality of foot gripping elements being disposed along a forward portion of a contour of at least one of the second plurality of holes, the second plurality of holes only having foot gripping elements of the second plurality of foot gripping elements, a forward-most first foot gripping element being disposed rearward of a rearward-most second foot gripping element.

2. The snowmobile of claim 1, wherein, in respect of each one of the pair of footrests, each foot gripping element in the first and second pluralities of foot gripping elements comprises a jagged portion at a top thereof.

3. The snowmobile of claim 1, wherein, in respect of each one of the pair of footrests, the first and second pluralities of foot gripping elements are sole foot gripping elements extending upwardly from the top surface.

4. The snowmobile of claim 1, wherein each one of the pair of footrests further includes;
a bottom surface; and
a plurality of deflector elements associated with at least some of the first plurality and the second plurality of holes and extending downwardly from the bottom surface for discouraging particles from passing through the at least some of the first plurality and the second plurality of holes.

5. The snowmobile of claim 1, wherein the tunnel is made at least in part from sheet metal.

6. The snowmobile of claim 5, wherein, in respect of each one of the pair of footrests, the first and second pluralities of foot gripping elements are integrally formed with the footrest.

7. A snowmobile footrest, comprising:
a top surface;
a first plurality of holes through the footrest;
a second plurality of holes through the footrest;
a first plurality of foot gripping elements extending upwardly and forwardly from the top surface, each foot gripping element in the first plurality of foot gripping elements being disposed along a rearward portion of a contour of at least one of the first plurality of holes, the plurality of first holes only having foot gripping elements of the first plurality of foot gripping elements; and
a second plurality of foot gripping elements extending upwardly and rearwardly from the top surface, each foot gripping element in the second plurality of foot gripping elements being disposed along a forward portion of a contour of at least one of the second plurality of holes, the plurality of second holes only having foot gripping elements of the second plurality of foot gripping elements, a forward-most first foot gripping element being disposed rearward of a rearward-most second foot gripping element.

8. The footrest of claim 7, wherein each foot gripping element in the first and second pluralities of foot gripping elements comprises a jagged portion at a top thereof.

9. The footrest of claim 7, wherein the first and second pluralities of foot gripping elements are sole foot gripping elements extending upwardly from the top surface.

10. The footrest of claim 7, further comprising:
a bottom surface; and
a plurality of deflector elements associated with at least some of the first plurality and the second plurality of holes and extending downwardly from the bottom surface for discouraging particles from passing through the at least some of the first plurality and the second plurality of holes.

11. The footrest of claim 7, wherein the footrest is made at least in part from sheet metal.

12. The footrest of claim 11, wherein the first and second pluralities of foot gripping elements are integrally formed with the footrest.

* * * * *